United States Patent
Sridhar et al.

(10) Patent No.: US 7,286,759 B1
(45) Date of Patent: Oct. 23, 2007

(54) SYSTEM AND METHOD FOR DYNAMIC WAVELENGTH ASSIGNMENT IN WAVELENGTH DIVISION MULTIPLEX RING NETWORKS

(75) Inventors: Kamakshi Sridhar, Plano, TX (US); An Ge, Plano, TX (US); Wonhong Cho, Frisco, TX (US)

(73) Assignee: Alcatel Lucent, Paris (FR)

( * ) Notice: Subject to any disclaimer, the term of this patent is extended or adjusted under 35 U.S.C. 154(b) by 623 days.

(21) Appl. No.: 10/405,530

(22) Filed: Apr. 2, 2003

Related U.S. Application Data

(63) Continuation-in-part of application No. 10/140,384, filed on May 6, 2002.

(60) Provisional application No. 60/372,337, filed on Apr. 12, 2002.

(51) Int. Cl.
*H04J 14/00* (2006.01)
*H04J 14/02* (2006.01)

(52) U.S. Cl. .......................... 398/43; 398/79
(58) Field of Classification Search ............ 398/42–69, 398/75–79, 83; 370/229
See application file for complete search history.

(56) References Cited

U.S. PATENT DOCUMENTS

| | | | |
|---|---|---|---|
| 5,801,861 A | 9/1998 | Majima | |
| 6,304,349 B1 | 10/2001 | Alanyali et al. | |
| 6,748,171 B1 * | 6/2004 | Homayoun et al. | 398/77 |
| 7,003,225 B2 * | 2/2006 | Iraschko et al. | 398/4 |
| 2002/0122442 A1 * | 9/2002 | Suemura | 370/535 |
| 2002/0154357 A1 * | 10/2002 | Ozveren et al. | 359/124 |
| 2004/0208587 A1 * | 10/2004 | Chang et al. | 398/100 |
| 2005/0002671 A1 * | 1/2005 | Smith et al. | 398/83 |

FOREIGN PATENT DOCUMENTS

JP    11 122258 A    4/1999

OTHER PUBLICATIONS

Gerstel et al. ("Dynamic wavelength allocation in all-optical ring networks", 1997 IEEE International Conference on Communications, Jun. 8-12, 1997, vol. 1, pp. 432-436).*
Yuan et al. ("Wavelength assignment to minimize the number of SONET ADMs in WDM rings", IEEE International Conference on Communications 2002, vol. 5, pp. 2917-2921).*

(Continued)

*Primary Examiner*—Jason Chan
*Assistant Examiner*—Quan-Zhen Wang
(74) *Attorney, Agent, or Firm*—Danamraj & Youst, PC; Bobby D. Slaton

(57) ABSTRACT

System and method for dynamically assigning wavelengths wavelength division multiplex ("WDM") ring networks is described. In one embodiment, the invention comprises a method for dynamic wavelength assignment on a ring in a WDM network comprising, for each new requested traffic flow from a source node to a destination node on the ring, for each segment on a path around the ring between the source and destination nodes, classifying the new requested traffic flow into one of a set of spatial relationship types for each existing wavelength; determining a corresponding number of optical-to-electrical and electrical-to-optical ("OEO") interfaces needed for each spatial relationship type selected for each segment; determining the total number of OEO interfaces needed for the entire path between the source and destination nodes along the ring; and selecting the existing wavelengths that minimize the OEO interfaces.

25 Claims, 11 Drawing Sheets

OTHER PUBLICATIONS

Wan et al. ("Grooming of arbitrary traffic in SONET/WDM rings", Global Telecommunication Coference-Globecom'99, pp. 1012-1016).*

Duser et al. ("Performance of a dynamically wavelength-routed, optical burst switched network", IEEE Photonics Technology Letters, Feb. 2002, vol. 14, pp. 239-241).*

L. Noirie et al. "Impact of intermediate traffic grouping on the dimensioning of multi-granularity optical networks"; OFC 2001, vol. 2, pp. TuG3-1-TuG3-3.*

Gerstel, et al., Worst-Case Analysis of Dynamic Wavelength Allocation in Optical Networks, IEEE/ACM Transactions on Networking, Dec. 1999, pp. 883-845, vol. 7, Issue: 6.

Berry, et al., Minimizing Electronic Multiplexing Costs for Dynamic Traffic in Unidirectional SONET Ring Networks, IEEE International Conference on Communications, 1999, pp. 1724-1730, vol. 3.

Gerstel, et al., Wavelength Assignment in a WDM Ring to Minimize Cost of Embedded SONET Rings, Seventeenth Annual Joint Conference of the IEEE Computer and Communications Societies, 1998, pp. 94-101, vol. 1.

Law, et al., Online Routing and Wavelength Assignment in Single-Hub WDM Rings, IEEE Journal on Selected Areas in Communications, Oct. 2000, pp. 2111-2122, vol. 18, Issue: 10.

Zhang, et al., An Effective and Comprehensive Approach for Traffic Grooming and Wavelength Assignment in SONET/WDM Rings, IEEE/ACM Transactions on Networking, Oct. 2000, pp. 608-617, vol. 8, Issue 5.

Herrera, et al., A Framework for IP Over Resilient Packet Rings, Internet Draft, IETF Working Group IP Over Resilient Packer Rings, Jun. 2001.

Liu, et al., Wavelength Assignment in WDM Rings to Minimize SONET ADMs, INFOCOM 2000, Nineteenth Annual Joint Conference of the IEEE Computer and Communications Societies, 2000, pp. 1020-1025, vol. 2.

Waldman, et al., Dynamic Priority Strategies for Wavelength Assignment in WDM Rings, GLOBECOM '00, IEEE Global Telecommunications Conference, 2000, pp. 1288-1292, vol. 2.

Wuttisttikulkij, et al., Design of an Efficient and Practical Algorithm for Wavelength Assignment in Multi-Wavelength Ring Transport Networks, GLOBECOM '97, IEEE Global Telecommunications Conference, 1997, pp. 571-575, vol. 1.

Ghafouri-Shiraz, Effective Wavelength Assignment Algorithms for Optimizing Design Costs in SONET/WDM Rings, Journal of Lightwave Technology, vol. 19, No. 10, Oct. 2001.

Tsiang, et al., The Cisco SRP MAC Layer Protocal, RFC 2892 IETF, Network Working Group, Aug. 2000.

Ellinas, et al., Scalability of a Novel Wavelength Assignment Algorithm for WDM Shared Protection Rings, OFC '98 Technical Digest, Jun. 1998, pp. 363-364, USA.

Kumar, M.S. et al., "Lightpath Setup Time Optimization in Wavelength Routed All-Optical Networks", Computer Communications, Elsevier Science Publishers BV, Amsterdam, NL, vol. 24, No. 10, May 15, 2001, pp. 984-995, XP004240648 ISSN: 0140-3664.

Strand, J. et al, "Importance of Wavelength Conversion in an Optical Network", Optical Networks Magazine, SPIE, Bellingham, WA, US, vol. 2, No. 3, May 2001, pp. 33-44, XP001081229, ISSN: 1388-6916.

Chen S, et al, "An Overview of Quality of Service Routing for Next-Generation High-Speed Networks: Problems and Solutions" IEEE Network, IEEE Service Center, New York, NY, US, vol. 12, No. 6 Nov. 1998, pp. 64-79, XP000873129 ISSN: 0890-8044.

* cited by examiner

| Case | E/O added | O/E added | Comment |
|---|---|---|---|
| L1 | 2 | 2 | grooming + space re-usable |
| L2 | 1 | 1 | space re-usable only |
| L3 | 2 | 2 | grooming only |
| L4 | 3 | 3 | grooming + space re-usable |
| L5 | 2 | 2 | grooming + space re-usable |
| L6 | 2 | 2 | grooming + space re-usable |
| L7 | 1 | 1 | grooming only |
| L8 | 1 | 1 | grooming only |
| L9 | 1 | 1 | grooming + space re-usable |
| L10 | 1 | 1 | grooming + space re-usable |
| L11 | 1 | 1 | space re-usable only |
| L12 | 0 | 0 | grooming only |
| L13 | 1 | 1 | unused |

*FIG. 3A*

|  | EO | OE |
|---|---|---|
| kL1 | k+1 | k+1 |
| kL1 | k+3 | k+3 |
| kL1+L5 | k+2 | k+2 |
| kL1+L6 | k+2 | k+2 |
| kL1+L9 | k+1 | k+1 |
| kL1+L10 | k+1 | k+1 |
| kL1+L5+L10 | k+2 | k+2 |
| kL1+L5+L6 | k+3 | k+3 |
| kL1+L9+L10 | k+1 | k+1 |
| kL1+L6+L9 | k+2 | k+2 |

*FIG. 3B*

SYSTEM AND METHOD FOR DYNAMIC WAVELENGTH ASSIGNMENT IN WAVELENGTH DIVISION MULTIPLEX RING NETWORKS

PRIORITY AND CROSS-REFERENCE TO RELATED APPLICATIONS UNDER 35 U.S.C. §119(e); 35 U.S.C. §120; 37 C.F.R. §1.53(b) and 37 C.F.R. §1.78

This nonprovisional application is a continuation-in-part of the following prior United States nonprovisional patent application entitled: System And Method For Dynamic Wavelength Assignment In Wavelength Division Multiplex Ring Networks, application Ser. No. 10/140,384, filed May 6, 2002, in the names of Kamakshi Sridhar, An Ge, and Wonhong Cho, which is hereby incorporated by reference for all purposes.

This nonprovisional application claims priority based upon the following prior United States provisional Patent application entitled: System And Method For Dynamic Wavelength Assignment In Wavelength Division Multiplex Ring Networks, Application No. 60/372,337, filed Apr. 12, 2002, in the names of Kamakshi Sridhar, An Ge, and Wonhong Cho, which is hereby incorporated by reference for all purposes.

BACKGROUND OF THE INVENTION

1. Technical Field of the Invention

The present invention generally relates to wavelength division multiplex ring networks. More particularly, and not by way of any limitation, the present invention is directed to a system and method for dynamically assigning wavelengths in such networks.

2. Description of Related Art

WDM rings, including circuit-based rings and packet rings, such as WDM Resilient Packet Rings ("RPRs") and WDM Gigabit Ethernet rings, are designed primarily for implementing metropolitan area networks ("MANs"). FIG. 1 is an example ring network 100 consisting of five nodes, respectively designated A-E, connected in a ring. Each node A-E is connected to its adjacent nodes via at least one link. Information is carried in one and only one direction on a ring, either clockwise or counter-clockwise.

A WDM ring is a ring with multiple wavelengths. Some wavelengths are assigned to traffic flows, while others are empty. The wavelengths assigned to flows carry traffic for one or more traffic classes (e.g., Gold, Silver, Best Effort) on each wavelength. Each time a new flow is admitted to the ring, a decision must be made as to on which wavelength the flow is to be sent. This choice directly affects the number of Optical/Electrical ("O/E") and Electrical/Optical ("E/O") interfaces that are to be included at each node, as well as the Quality of Service ("QoS") of the existing flows. As used herein, QoS is synonymous with performance.

There are four types of wavelengths on which a new flow may be sent. First, a new flow may be sent on a new wavelength not assigned anywhere on the ring. Such wavelengths are designated "unused" wavelengths. Alternatively, a new flow may be sent on an existing wavelength that overlaps with the path for the new flow and still has available bandwidth. Such wavelengths are designated "grooming" wavelengths. Still further, a new flow may be sent on an existing wavelength that has been used in some other section of the ring, but will not overlap with the path for the new flow. Such wavelengths are designated "space-reusable" wavelengths. Finally, the new flow may be sent on an existing wavelength that has been used in some other section of the ring and will overlap with the path for the new flow. Such wavelengths are designated "grooming+space-reusable" wavelengths.

Each time a new wavelength is added at a node, an EO interface is required. Each time a new wavelength is dropped at a node, an OE interface is required. In contrast, if an existing wavelength is reused to carry new traffic in addition to the existing traffic it is carrying, no new OE or EO interfaces are required to be added. Use of existing wavelengths to transport new flows is likely to yield more optimal solutions; that is, selection of wavelengths with fewer OE/EO interfaces, which translates to lower costs.

It is therefore desirable to assign a wavelength to a new flow such that it results in the addition of a minimum number of OE/EO interfaces. A constraint on this goal is that the wavelength assignment of existing flows must not be changed to avoid rerouting of existing traffic flows. QoS issues may also be considered in identifying the optimal wavelength to which to assign a new flow. For example, the optimal wavelength may also be the one that best preserves the QoS of existing flows and maximizes the QoS for the new flow.

The term "dynamic" in "dynamic wavelength assignment" refers to the fact that optimal wavelengths are determined based on information about remaining available resources (e.g., wavelengths, OEs/EOs, bandwidth). Resources allocated to existing flows are not considered part of the optimization problem. In contrast, "static" solutions require that the information about all of the flows that will be added to the network be known before the optimization is performed.

Previously, a "default" method of assigning wavelengths to flows in WDM rings has been to perform an extensive search over all of the wavelengths and take the wavelength that best minimizes the number of OE/EO interfaces added. This method is deficient in that it is computationally intensive, particularly in rings with a large number of nodes and wavelengths. Two other default methods are referred to as "first-fit" and "best-fit"; however, neither first-fit nor best-fit consider minimization of OE/EO interfaces in the optimization.

Many of the remaining prior art solutions are restricted to static wavelength assignment methods. The primary disadvantage of static wavelength assignment methods is that, by definition, they provide static solutions; i.e., the best wavelength is determined a priori before admitting any new flow. This requires that the traffic matrix containing information for all possible flows (e.g., source, destination, traffic class, and available bandwidth) be known in advance. Clearly, this information may not always be available. Further, the addition of a new flow not already considered in the traffic matrix requires the redoing of the complete optimization with the new traffic flow; hence, optimal wavelengths cannot be computed in real time.

Additional deficiencies inherent in static solutions is that existing flows may have to be rerouted based on the results of the new optimization, which may not always be acceptable. Additionally, such solutions are computationally expensive because they require redoing the complete optimization each time.

In contrast to static solutions discussed above, a dynamic wavelength assignment algorithm would compute optimal wavelengths based on remaining resources and therefore would not require rerouting of existing traffic and resources. In particular, O. Gerstel, G. Sasaki, S. Kutten, R.

Ramaswami, "Worst-Case Analysis of Dynamic Wavelength Allocation in Optical Networks," IEEE/ACM Transactions on Networking, Volume 7, No. 6, December 1999 (hereinafter referred to as "Worst-Case Analysis"), discloses the worst case bounds for dynamic wavelength assignment in a WDM ring. However, "Worst-Case Analysis" provides no heuristics for dynamic wavelength assignment in WDM rings; moreover, it describes only mathematical bounds and does not provide an algorithm for dynamic wavelength assignment.

All other known prior art "dynamic" solutions relate to dynamic wavelength assignment in hubs and do not address WDM rings. Moreover, no known prior art solution considers the QoS of the existing flows and net traffic flows in the optimization process.

SUMMARY OF THE INVENTION

Accordingly, the present invention advantageously provides a system and method for dynamic wavelength assignment in WDM rings, including circuit-based rings and packet rings, such as RPRs and Gigabit Ethernet. In one embodiment, the present invention comprises a method and system for wavelength assignment in WDM rings that minimizes the total number of OE and EO interfaces added to the ring. The "total number of OE/EO interfaces added" refers to the sum of the OE/EO interfaces added at various nodes of the ring when a new flow is added to the network. In one embodiment, QoS considerations are ignored. In another embodiment, an attempt is made to best preserve the QoS of existing traffic flows and maximize the QoS of the traffic flow being added.

In accordance with features of either embodiment, and as will be described in detail below, initially, an exhaustive set of thirteen cases based on the spatial relationship between existing wavelengths and an incoming flow in a unidirectional ring of a WDM ring is identified. These thirteen cases collectively constitute a SuperSet. Next, an OE/EO table is defined which identifies for each case in the SuperSet the total number of OE and EO interfaces added for that case when the new flow is added to existing or new wavelengths. Each entry in the OE/EO table corresponds to one of the thirteen cases in the SuperSet.

Additionally, a QoS table containing the order of priority for the selection of a wavelength given a new input flow of a certain traffic class may be defined for use in connection with the second embodiment in which QoS issues are taken into account in assigning a wavelength to a new flow. The QoS table defines the order of priority in which an existing wavelength must be selected to add a new flow of a certain traffic class. The QoS table is constructed using heuristics of the QoS impact on the new flow due to the addition of various mixes of traffic classes. Wavelength grades account for the QoS impact on existing flows due to the addition of a new flow of a certain traffic class.

Also, a method is defined for implementing dynamic wavelength assignment in WDM rings. Given a new flow to be added between a node pair, the mapping between the traffic in the network to the SuperSet cases is identified and the optimal case that minimizes the total number of OE/EO interfaces added is selected from the OE/EO table. If the QoS of the flows need not be considered, as in the first embodiment, then one of these wavelengths is selected. The optimization is then assumed to be complete. If QoS of the existing flows and the new flow must be considered, as in the second embodiment, then the QoS table is referred to and the wavelength grades are used to determine whether or not using the selected wavelength will result in an acceptable performance for existing traffic flows and the new traffic flow. Lookup iterations between the OE/EO table and the QoS table and wavelength grades may be required to arrive at a suitable wavelength.

The method then minimizes the total number of OE/EO interfaces added and ensures that the QoS of various traffic classes is met. It should be noted that the OE/EO table is required for optimization in both embodiments, while the QoS table and the wavelength grades are required only for optimization in the second embodiment.

In one embodiment, the invention is a method of assigning a wavelength to an incoming flow in communications network comprising steps of grouping wavelengths in the network into collections' of wavelengths, mapping each collection of wavelengths to one of several cases, wherein each of the cases is representative of a spatial relationship between existing traffic in a network and an incoming flow, selecting one of the cases to which the collections of wavelengths has been mapped, and selecting a wavelength from the collection of wavelengths corresponding to the selected one of the cases to be assigned to the incoming flow.

In another embodiment, the invention is a method of assigning a wavelength to an incoming flow in communications network comprising steps of grouping wavelengths in the network into collections of wavelengths, mapping each collection of wavelengths to one of several cases, wherein each of the cases is representative of a spatial relationship between existing traffic in a network and an incoming flow, selecting one of the cases to which the collections have been mapped by identifying which of the cases to which the collections of wavelengths has been mapped results in the fewest total number of optical-to-electrical ("OE") and electrical-to-optical ("EO") interfaces being added to the network, and selecting a wavelength from the collection of wavelengths corresponding to the selected one of the cases to be assigned to the incoming flow, wherein the selecting is performed such that a performance of traffic of the incoming flow is maximized and performance of existing traffic in the network is minimally affected.

In another embodiment, the invention is a system for assigning a wavelength to an incoming flow in communications network comprising means for grouping wavelengths in the network into collections of wavelengths, means for mapping each collection of wavelengths to one of several cases, wherein each of the cases is representative of a spatial relationship between existing traffic in a network and an incoming flow, means for selecting one of the cases to which the collections of wavelengths has been mapped, and means for selecting a wavelength from the collection of wavelengths corresponding to the selected one of the cases to be assigned to the incoming flow.

In a yet further embodiment, the invention comprises a method for dynamic wavelength assignment on a ring in a WDM network comprising a plurality of steps for each new requested traffic flow from a source node to a destination node on the ring based on wavelength conversion capability. These steps include, for each segment on a path around the ring between the source and destination nodes, classifying the new requested traffic flow into one of a set of spatial relationship types for each existing wavelength; determining a corresponding number of optical-to-electrical and electrical-to-optical ("OEO") interfaces needed for each spatial relationship type selected for each segment; determining the total number of OEO interfaces needed for the entire path between the source and destination nodes along the ring; and selecting the existing wavelengths that minimize the OEO interfaces.

In a still further embodiment, the invention comprises a method for performing dynamic wavelength assignment on a ring in a WDM network. The method comprises, for each new requested traffic flow from a source node to a destination node on the ring, identifying all possible routes from the source node to the destination node; for each of the identified routes, proceeding one hop at a time, determining a wavelength that requires a minimum number of OEO interfaces on each sub-path comprising the route; for each of the identified routes, adding the minimum number of OEO interfaces determined for all of the sub-paths of the route to calculate a total minimum number of OEO interfaces for the route; and selecting the route having the smallest total minimum number of OEO interfaces.

In another embodiment relating to wavelength conversion, the invention is directed to a system for performing dynamic wavelength assignment on a ring in a WDM network comprising, for each new requested traffic flow from a source node to a destination node on the ring, means for classifying the new requested traffic flow into one of a set of spatial relationship types for each existing wavelength for each segment on a path around the ring between the source and destination nodes; means for determining a corresponding number of OEO interfaces needed for each spatial relationship type selected for each segment; means for determining the total number of OEO interfaces needed for the entire path between the source and destination nodes along the ring; and means for selecting the existing wavelengths that minimize the OEO interfaces.

BRIEF DESCRIPTION OF THE DRAWINGS

A more complete understanding of the present invention may be had by reference to the following Detailed Description when taken in conjunction with the accompanying drawings wherein:

FIGS. 3A and 3B depict OE/EO tables for use in connection with an embodiment of the present invention;

DETAILED DESCRIPTION OF THE DRAWINGS

Figure 1:
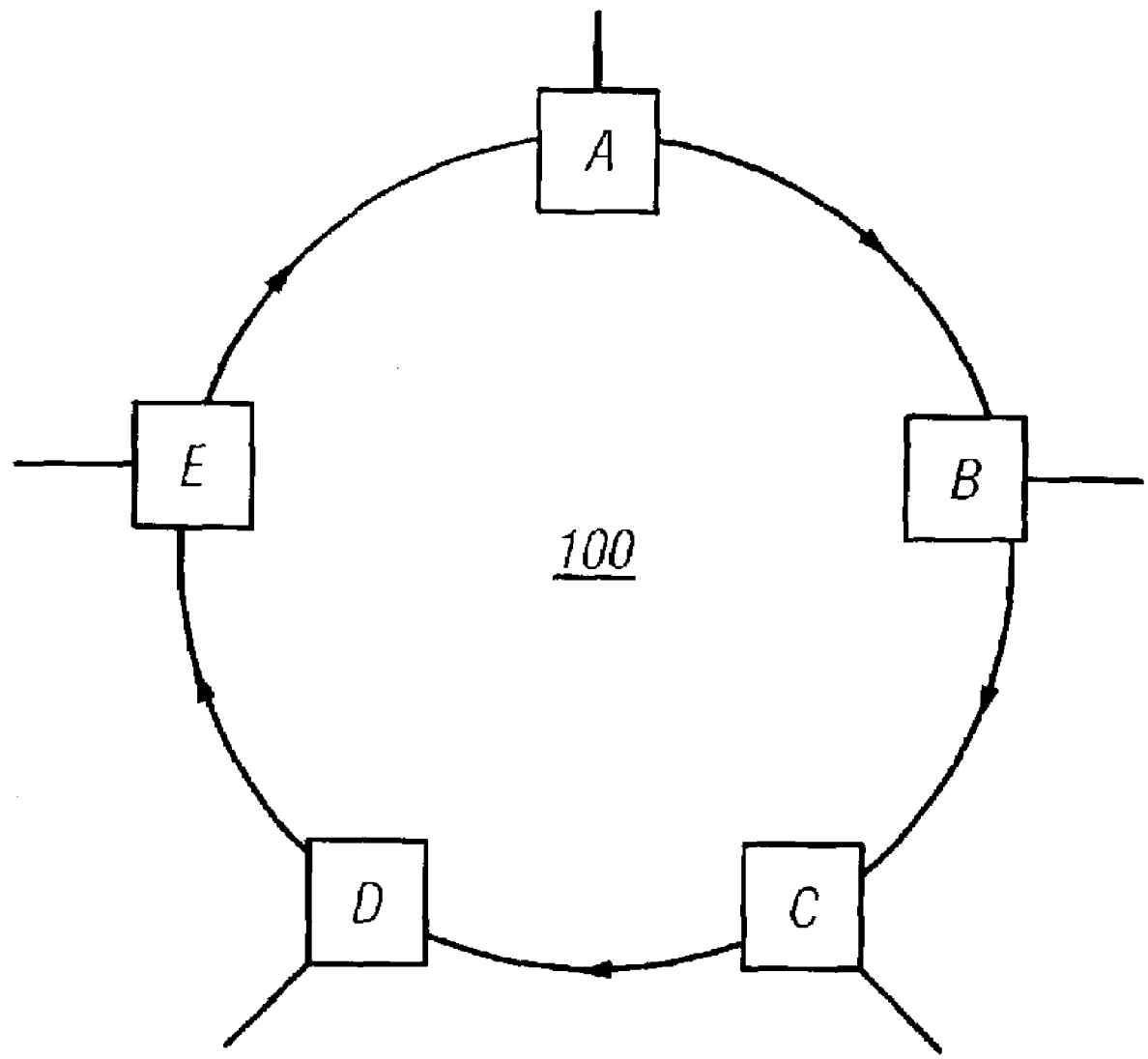
FIG. 1 depicts an exemplary WDM ring network arrangement in which teachings of the present invention may be advantageously practiced.

In the drawings, like or similar elements are designated with identical reference numerals throughout the several views thereof, and the various elements depicted are not necessarily drawn to scale.

Referring again to FIG. 1, depicted therein is an exemplary WDM ring network 100 in which the teachings of the present invention may be advantageously practiced. It should be recognized that, although the WDM ring network 100 comprises five nodes A-E, in general, there can be more or fewer nodes on the network 100. Moreover, although each of the nodes A-E are illustrated as being connected to its adjacent nodes by only two links, it should be recognized that the principles of the invention described herein can be applied to a WDM ring comprising more than one ring, and therefore more than one link between adjacent nodes.

Figure 2:
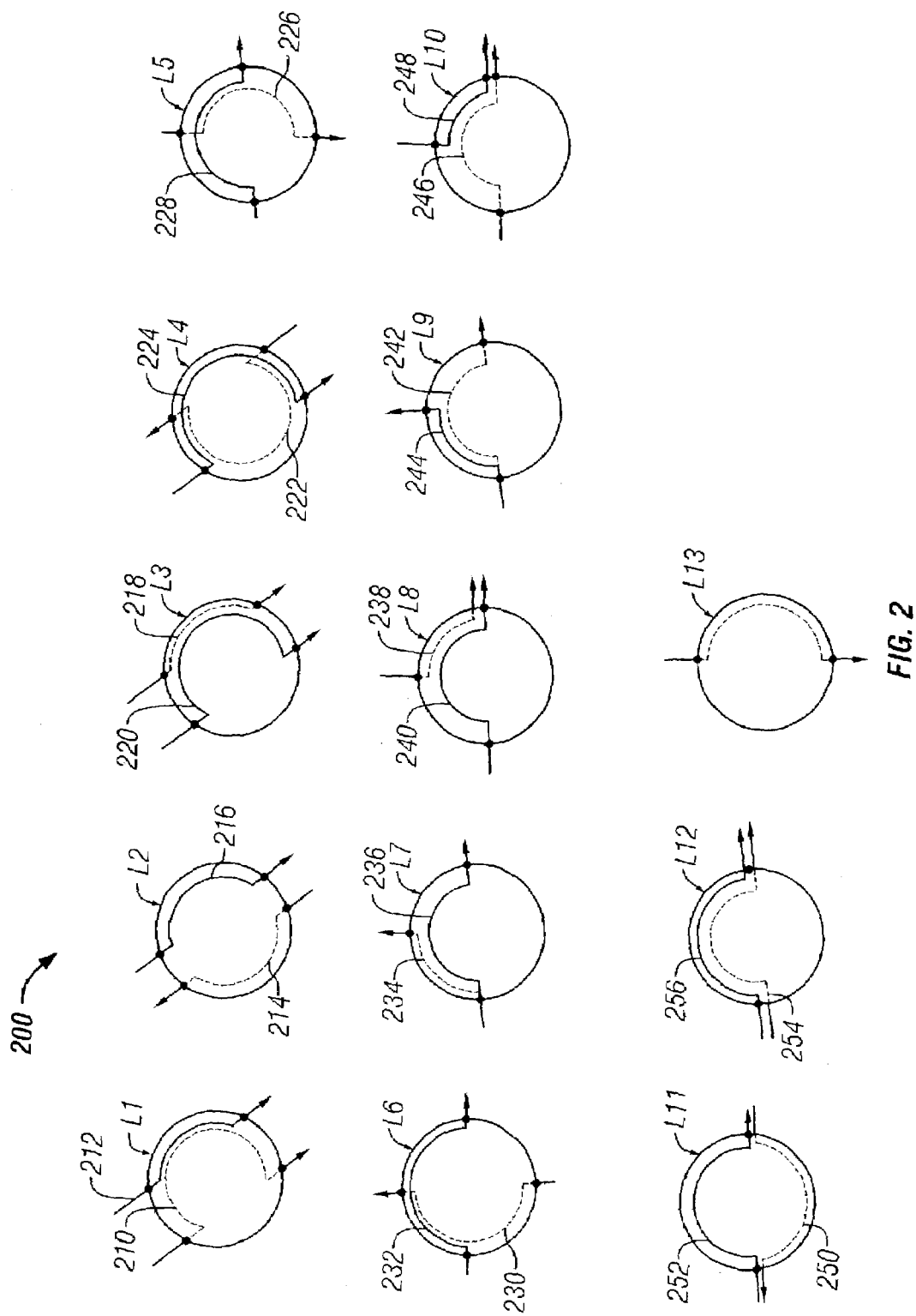
FIG. 2 depicts a SuperSet comprising an exhaustive collection of thirteen cases that collectively define all possible spatial combinations of a new flow in relation to one or more existing wavelengths in a WDM ring network.

As previously indicated, as an initial step, a SuperSet comprising an exhaustive collection of scenarios representing the spatial relationship of a new flow with respect to an existing wavelength or wavelengths is defined. FIG. 2 illustrates a SuperSet 200. As previously noted, the SuperSet 200 comprises thirteen scenarios, or "cases," designated in FIG. 2 by reference numerals L1-L13, respectively, that collectively define all possible spatial combinations of a new flow in relation to one or more existing wavelengths. The identification of a finite, limited number of cases L1-L13 covering all scenarios for wavelength setup is possible because the nodes in a ring are connected in a specific arrangement. In FIG. 2, dashed lines are used to represent new flows required to be added to the network, while solid lines are used to represent existing wavelengths. It is assumed that the existing wavelength or wavelengths are not dropped at any other intermediate node except its source and destination. If a wavelength is dropped at one or more intermediate nodes, then it must be considered as one or more separate spatial cases L1-L13, or combinations thereof, in relation to the new flow.

All examples below are described with respect to a clockwise ring. The cases illustrated in FIG. 2 are defined as follows.

In case L1, a new flow 210 is outside an existing wavelength, but there is a portion of the ring where the new flow 210 and existing wavelength 212 share a common path. In case L2, a new flow 214 is outside an existing wavelength 216 with no overlap of paths (i.e., shared regions in the ring) at all. In case L3, a new flow 218 is inside an existing wavelength 220.

In case L4, a new flow 222 is partly inside and partly outside an existing wavelength 224. In case L5, a new flow 226 spans part of an existing wavelength 228. In case L6, a new flow 330 spans part of an existing wavelength 232. Case L6 differs from case L5 in its direction. In case L7, a new flow 234 spans part of an existing wavelength 236 having a common source. The path for the new flow 234 is "inside" that of the existing wavelength 236. In case L8, a new flow 238 spans part of an existing wavelength 240 having a common destination. The path for the new flow 238 is "inside" that of the existing wavelength 240.

In case L9, a new flow 242 spans part of an existing wavelength 244 having a common source. The path for the new flow 242 is "outside" that of the existing wavelength 244. In case L10, a new flow 246 spans part of an existing wavelength 248 having a common source. The path for the new flow 246 is "outside" that of the existing wavelength 248. In case L11, a new flow 250 spans exactly the opposite route (i.e., opposite direction) as an existing wavelength 252. In case L12, a new flow 254 spans exactly the same route as an existing flow 256. In case L13, there are no existing wavelengths.

In addition to the SuperSet, OE/EO tables must be defined. FIG. 3A illustrates an first OE/EO table 300. Specifically, the OE/EO table 300 indicates, for each case, the number of OE and EO interfaces added at the various nodes when a new flow is sent on the wavelength corresponding to a given case L1-L13 in the SuperSet 200 illustrated in FIG. 2. For example, if a new flow is sent on a wavelength corresponding to case L3 (FIG. 2), then a total of two OE interfaces and two EO interfaces must be added in the network. The table 300 also includes, for each case L1-L13, in a column designated "Comments" an indication of the "wavelength type" of the case; that is, the type of wavelength (i.e., grooming+space-reusable, grooming only, space reusable only, unused) used to send the new flow. As will be described in greater detail below, the choice of the wavelength type helps provide another optional order of priority for the cases that have the same total number of OE interfaces and EO interfaces added. This helps reduce the choice of available cases in the selection of an appropriate case.

In addition, FIG. 3B illustrates a second OE/EO table 350, which sets forth the ten and only 10 combinations of the various cases L1-L13. In FIG. 3B, "k" represents multiple L1 cases that may exist simultaneously. Both of the OE/EO tables 300 and 350 are used to calculate the number of OE/EO interfaces added.

For purposes of discussion, it will be assumed that traffic in the network 100 is classified into three classes of service, including Gold ("G"), which is the highest priority, Silver ("S"), which is medium priority, and Best Effort ("BE"), which is the lowest priority. It will be recognized, however, that the principles described herein apply to greater or fewer classes of service, as well as to alternative definitions of classes of service.

Figure 4:
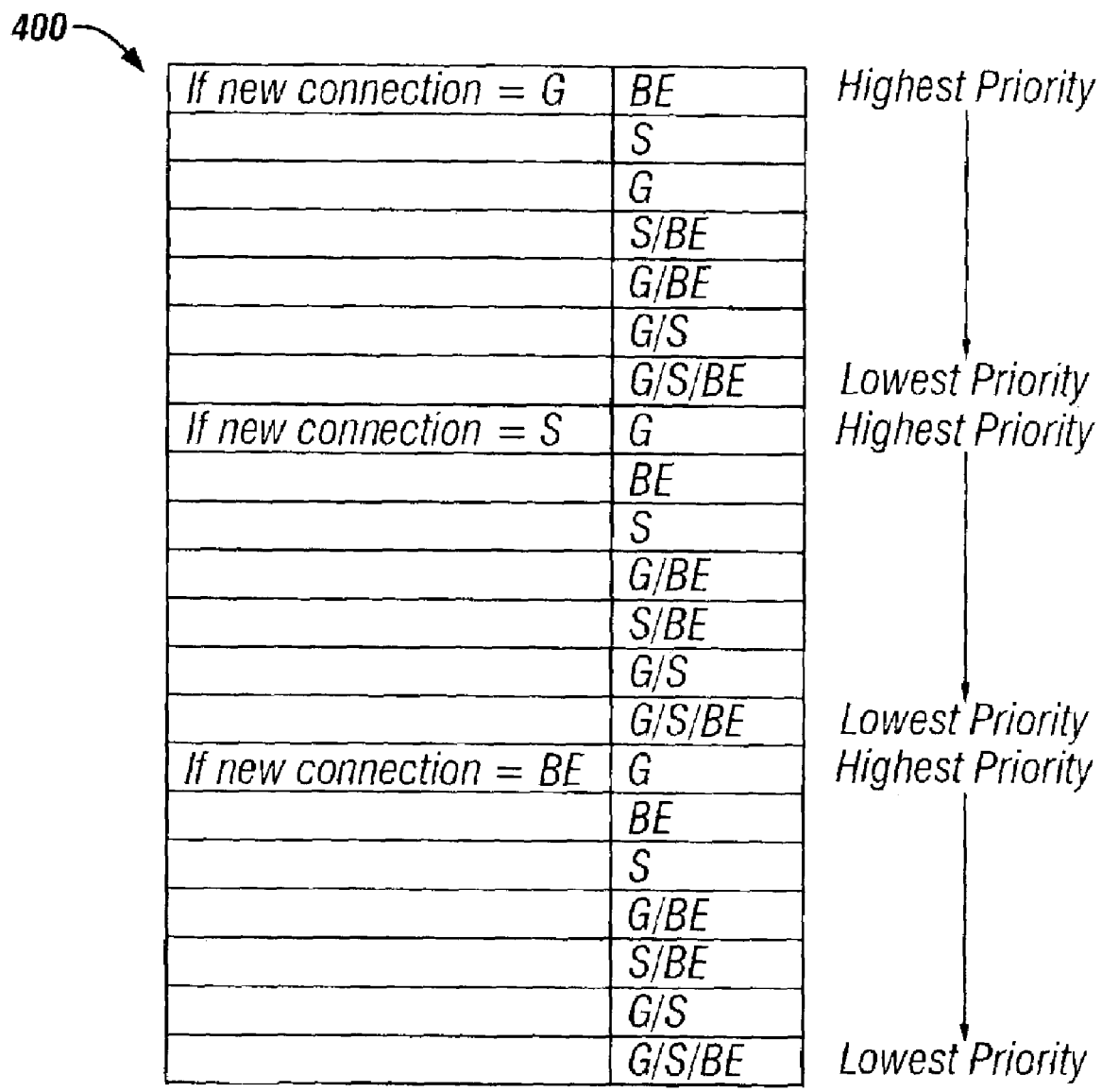
FIG. 4 depicts a QoS table for use in connection with an embodiment of the present invention.

Accordingly, if QoS considerations are to be included in the optimization process, as is the case with the second embodiment referred to above, then a QoS table 400, illustrated in FIG. 4, must be defined. The purpose of the QoS table 400 is to help select a case that would best maximize the performance for the new flow. The QoS table 400 is constructed using heuristics to ensure that the QoS for the new flow is best satisfied. The QoS table 400 defines for each class of service of a new flow the priority, in decreasing order, in which the wavelengths should be selected when a new flow is admitted to the network.

In the QoS table 400, a "G" designates a wavelength carrying only Gold traffic. It may contain multiple wavelengths carrying only Gold traffic. Likewise, an "S" and a "BE" respectively designate wavelengths carrying only Silver and Best Effort traffic. A "G/S" designates a wavelength carrying both Gold and Silver traffic. It may contain multiple wavelengths carrying Gold and Silver traffic. Similarly, "G/BE" and "S/BE" respectively designate wavelengths carrying only Gold and Best Effort and Silver and Best Effort traffic. A "G/S/BE" designates a wavelength carrying Gold, Silver, and Best Effort traffic.

Using the table 400, when a new Gold (G) flow is admitted, the first choice of wavelength to which to assign the flow is one carrying Best Effort (BE) traffic, the next choice of wavelength is a wavelength carrying Silver (S) traffic, and so on. Similarly, when a new Silver (S) flow is admitted, the first choice of wavelength to which to assign the flow is a wavelength carrying Gold (G) traffic, the second choice is a wavelength carrying Best Effort (BE) traffic, and so on. Finally, when a new Best Effort (BE) flow is added, the first choice of wavelength is one that is carrying Gold (G) traffic, the second choice is a wavelength carrying Best Effort (BE) traffic, and so on. For obvious reasons, the last choice of wavelength for a new flow of any class is a wavelength carrying all three types of traffic (G/S/BE).

The QoS table 400 is constructed using the following heuristics. First, Gold bandwidth is dedicated bandwidth that may not be used by any other class. Silver bandwidth is allocated to Silver users but may be shared by Best Effort users or may be pre-empted by a Gold user. If there is an existing Best Effort user, then Silver has higher priority. Alternate definitions of each traffic class may result in different heuristics, and hence different order of priorities within the QoS table 400, but it would not affect the methodology for wavelength assignment in a WDM ring as described herein.

As previously indicated, wavelength grades are used to ensure that the QoS of existing traffic is best preserved. Wavelength grade refers to the classification of a wavelength into a one class, two class, or three class wavelength. A one class wavelength is defined as a wavelength that can carry only one class of traffic (e.g., Gold, Silver, or Best Effort) at a given time. A two class wavelength is defined as a wavelength that can carry only two classes of traffic (e.g., Gold and Silver (G/S), Silver and Best Effort (S/BE), or Gold and Best Effort (G/BE)) at a given time. Finally, a three class wavelength is defined as a wavelength that can carry all three classes of traffic (e.g., Gold/Silver/Best Effort (G/S/BE)) at once. It should be recognized that more or fewer than three wavelength grades may be defined in cases where more or fewer than three classes of service are available.

As previously indicated, there are two general techniques, or embodiments, for implementing the dynamic wavelength assignment in a WDM ring in accordance with the teachings of the present intention. According to one embodiment, referred to herein as "dynamic wavelength assignment without QoS considerations," only the total number of OE/EO interfaces added for wavelength assignment are minimized. This method does not take into account QoS considerations with respect to new or existing traffic flows. The other embodiment, referred to herein as "dynamic wavelength assignment with QoS considerations," does take such QoS concerns into account during the optimization process in addition to minimizing the total number of OE/EO interfaces added. With either method, the OE/EO tables 300/350 are used, while the QoS table and wavelength grades are only employed in connection with the second method. Each of these methods will now be described in greater detail.

Figure 5:
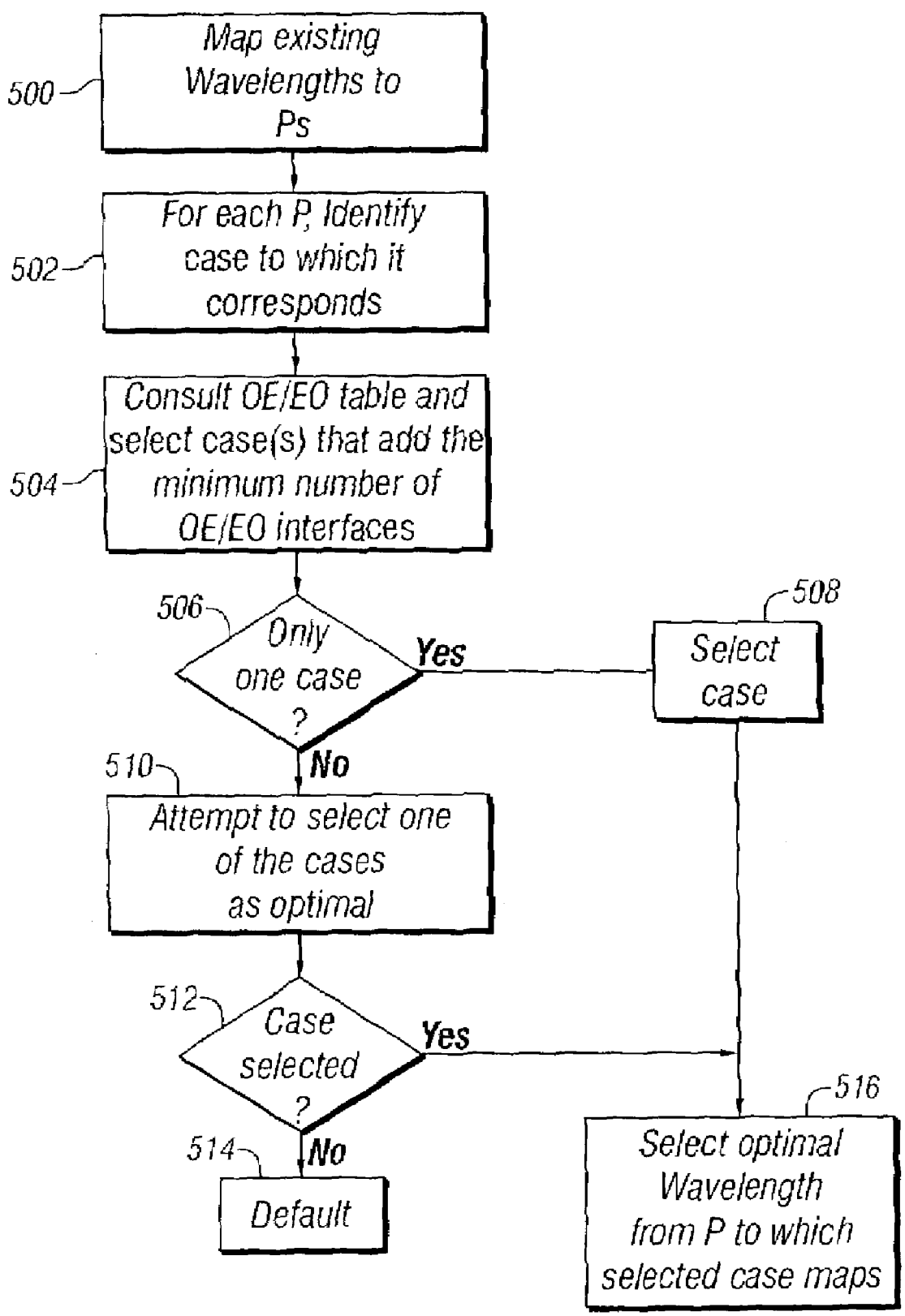
FIG. 5 is a flowchart of the operation of one embodiment of the present invention in which QoS considerations are not taken into account.
Figure 6A:
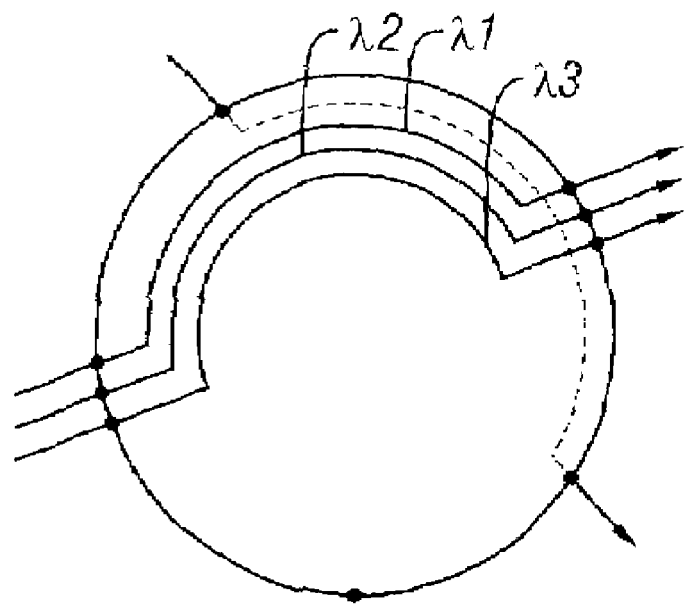
FIGS. 6A and 6B illustrate mapping of existing wavelengths to respective collections of existing wavelengths in the network that have the same traffic class and the same spatial relationship with respect to a new flow.
Figure 6B:
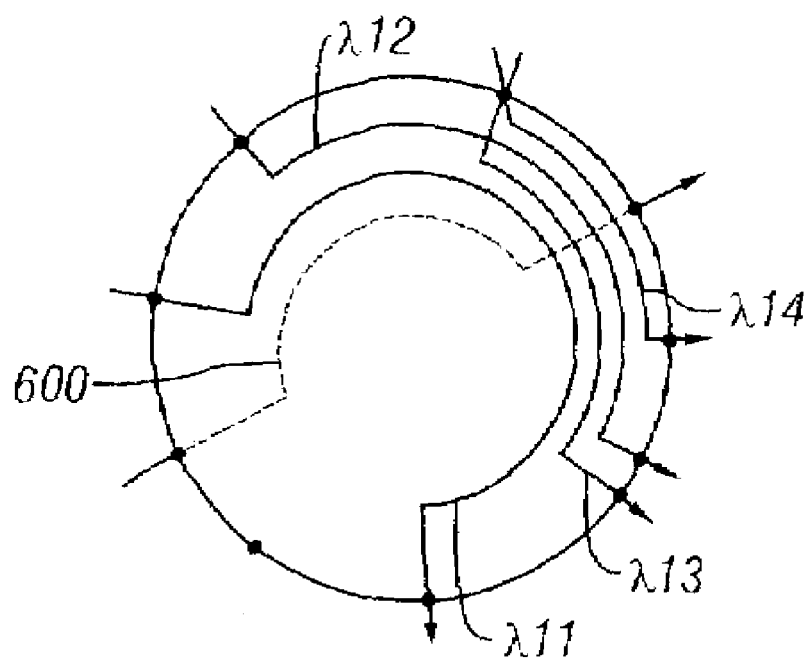

FIG. 5 is a flowchart illustrating the operation of the dynamic wavelength assignment without QoS considerations method of the present invention. In step 500, the existing wavelengths ($\lambda_i$s) are mapped to "Ps". As used herein, a P designates a collection of wavelengths in the network that have the same traffic class and the same spatial relationship with respect to the new flow. For example, assume that there are m existing wavelengths. For a new incoming traffic flow, the m existing wavelengths are grouped into n Ps where $n \leq m$. The grouping is performed using a bandwidth table (not shown) at each node containing source and destination information for each wavelength. Traffic class is not considered in performing this grouping. The purpose is to group existing wavelengths into identifiable traffic patterns to speed up the optimization process. The assumption is that each node maintains a bandwidth table (not shown) containing this information about all of the wavelengths in the network. The rules are that wavelengths having the same source and same destination may be grouped into one P as illustrated in FIG. 6A, in which wavelengths $\lambda_1$-$\lambda_3$ may be grouped into one P ($P_1$), and that wavelengths having different sources and different destinations may be grouped into the same P if they have the same spatial relationship with respect to a new flow 600, as illustrated in FIG. 6B, in which wavelengths $\lambda_{11}$-$\lambda_{14}$ may be grouped into a single P ($P_2$).

In step 502, for each P created in step 500, a case in the SuperSet 200 to which the P corresponds is identified. In this manner, each wavelength is mapped to a P and to a corresponding case in the SuperSet. It may be, for example, that existing flows map to only case L2 and case L5 and that all other cases carry zero traffic.

In step 504, the OE/EO tables 300/350 are consulted and the case or cases identified in step 502 that minimize the total number of OE interfaces and EO interfaces added are identified. The identified case or cases map back to one or more Ps and one or more wavelengths. In step 506, a determination is made whether one and only one case is identified in step 504. If so, execution proceeds to step 508, in which the identified case is designated as the optimal solution. If more than one case is identified in step 504, execution proceeds to step 510, in which a single case is selected as the optimal solution using other criteria.

For example, one way to select one case from among the identified cases is in decreasing order of priority: first, "grooming+space-reusable" wavelengths, then "grooming only" wavelengths, then "space-reusable only" wavelengths, then "unused" wavelengths. A different order of preference could be selected for implementation. Alternatively, a Monte Carlo process or a first-fit process may be used to pick from one of the identified cases.

In step 512, a determination is made whether one case has been selected. If not, a default option is applied in step 514. This default option may be, for example, to exit the method. If in step 512 it is determined that one case has been selected, in step 516, an optimal wavelength from within the wavelengths to which the case maps is selected. If multiple wavelengths are available within a case, a Monte Carlo process can be applied to randomly select one of the available wavelengths. An example of the method illustrated in FIG. 5 will be given below.

Figure 7:
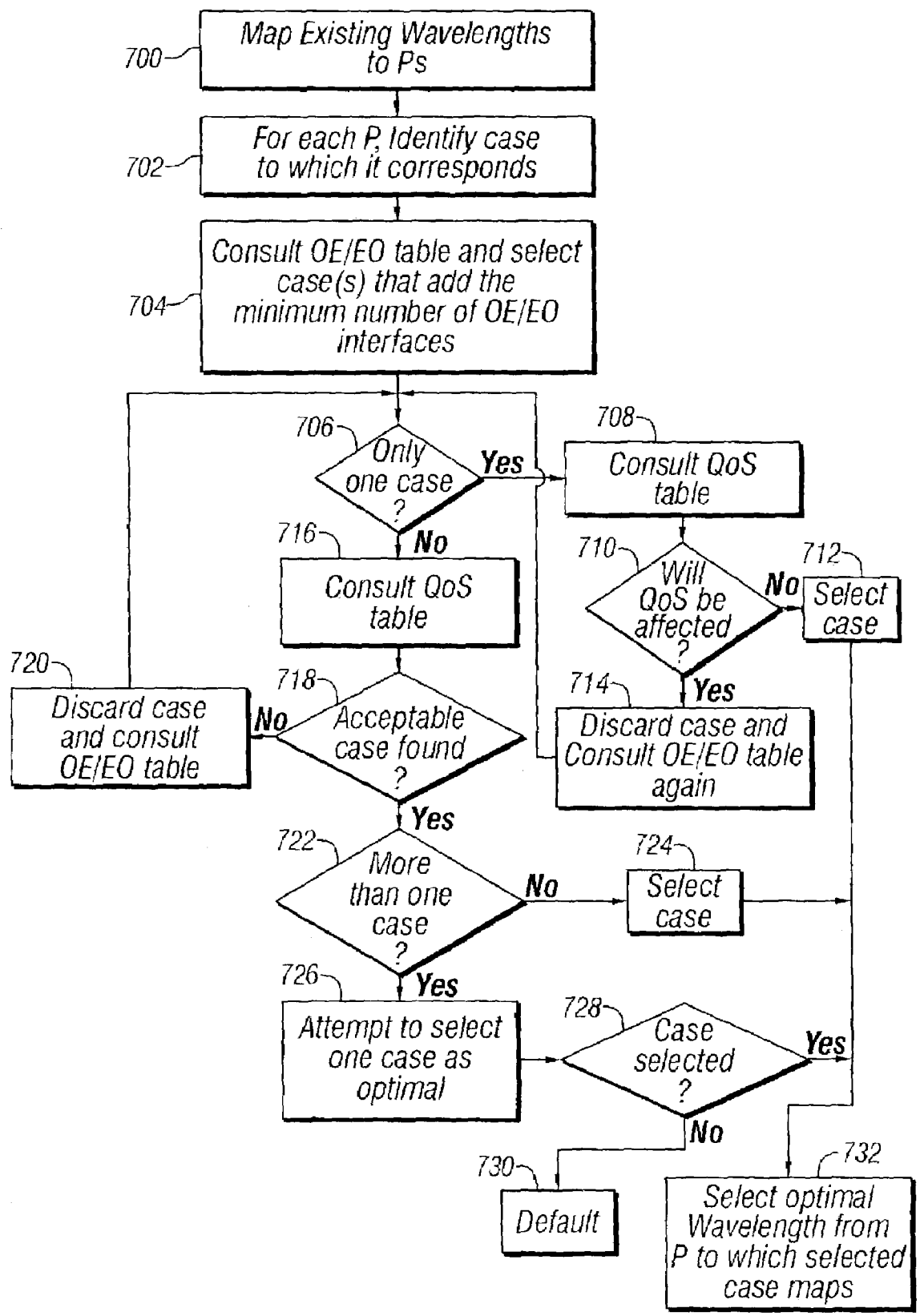
FIG. 7 is a flowchart of the operation of one embodiment of the present invention in which QoS considerations are taken into account.

FIG. 7 is a flowchart illustrating the operation of the dynamic wavelength assignment with QoS considerations method of the present invention. In step 700, the existing wavelengths ($\lambda_i$s) are mapped to Ps. Assume that there are m existing wavelengths. For a new incoming traffic flow, the m existing wavelengths are grouped into n Ps where n$\leq$m. The grouping is performed using the bandwidth table containing source and destination information for each wavelength.

In this embodiment, traffic class is considered in performing the grouping. The purpose is to group existing wavelengths into identifiable traffic patterns to speed up the optimization process. The assumption is that each node maintains a bandwidth table containing this information about all of the wavelengths in the network. The rules are that wavelengths from the same source, same destination, and same traffic class may be grouped into one P; therefore, the wavelengths $\lambda_1$-$\lambda_3$ (FIG. 6A) may be grouped into one P so long as they carry the same mix of traffic classes.

In contrast, assuming for the sake of example that the wavelength $\lambda_1$ carries G/S traffic and the wavelengths $\lambda_2$ and $\lambda_3$ carry G traffic, wavelengths $\lambda_2$ and $\lambda_3$ may be grouped into a single P, but the wavelength $\lambda_1$ must be grouped into a separate P. Similarly, existing wavelengths from different sources and different destinations may be grouped into the same P only if they have the same spatial relationship with respect to a new flow and they carry the same mix of traffic classes. For example, referring again to FIG. 6B, wavelengths $\lambda_{11}$, $\lambda_{12}$, $\lambda_{13}$, and $\lambda_{14}$ may be grouped into a single P so long as they carry the same mix of traffic classes (e.g., G/S/BE). Any one of them that carries a different mix of traffic classes must be grouped into a separate P.

In step 702, for each P defined in step 700, the case in the SuperSet 200 (FIG. 2) to which it corresponds is identified. In this manner, each wavelength is mapped to a P and then to a corresponding case in the SuperSet. It may be, for example, that existing traffic may map only to cases L2 and L5 and all other cases carry zero traffic.

In step 704, the OE/EO tables 300/350 are consulted and the relevant case or cases that minimize the total number of OE interfaces and EO interfaces added are identified. The identified cases map back to one or more Ps and one or more wavelengths. In step 706, a determination is made whether one and only one case is identified in step 704. If so, execution proceeds to step 708.

As previously noted, because the objective in this embodiment is to preserve a certain level of performance for existing flows and also meet a certain minimum level of performance for a new flow, in step 708, the QoS table 400 (FIG. 4) is consulted to ensure that the performance of the new flow is best maximized. In particular, the classification of a given P into wavelength grades helps to ensure that the QoS of the traffic in the existing flows are preserved. Note that because all of the wavelengths in a given P have the same mix of traffic class, a given P will belong only to one wavelength grade.

In step 710, the wavelength grade criteria are applied to determine whether using the identified case will affect the QoS of the new flow and the existing flows. For example, the new flow may require a minimum of a two class wavelength grade and the existing flow(s) may require a minimum of a two class wavelength grade. Consider a P that maps to case L5. Suppose case L5 is a two class wavelength and that it already has two classes of service, e.g., Gold and Best Effort. In this case, it would be unacceptable to use case L5 to add a Silver class because it would result in the degradation of case L5 to a three class wavelength grade, thus violating its specifications. However, if the case L5 is only a one class wavelength grade, then the choice of case L5 is suitable because the addition of a traffic class will result in a two class wavelength grade. This does not violate the requirements for case L5. The solution obtained is feasible and optimization is complete.

Returning to step 710, if it determined that the identified case will not negatively affect QoS, execution proceeds to step 712, in which the case is selected as the optimal solution. Otherwise, execution proceeds to step 714, in which the identified case is discarded and the OE/EO tables 300/350 are again referred to and the next best case(s) that minimize the total number of OE/EO interfaces added are identified. It will be recognized that this "minimum" will be equal to or greater than the minimum previously obtained. Execution then returns to step 706. Steps 708-714 are repeated until an acceptable case is identified. In this manner, an attempt is made to best minimize the total number of OE/EO interfaces added while also preserving the QoS of existing and new flows.

Returning again to step 706, assuming that many cases (and hence many Ps) are identified that minimize the total number of OE/EO interfaces added, execution proceeds to step 716. For example, cases L1, L5, and L6 may be selected. It should be noted that because all of the selected cases use grooming and space-reusable wavelengths, there is no way to further narrow the selection using the OE/EO tables 300/350.

In step 716, the QoS table 400 is again consulted to determine which of the identified cases is best to add a new flow, but minimally affect the QoS of existing traffic flows and best maximize the QoS of the new flow. It will be assumed that none of the cases violate the wavelength grade requirements. For example, if the new incoming flow has Silver traffic and L1 carries Gold/Best Effort, case L5 carries Silver/Best Effort, and case L6 carries Silver traffic, then it is best to use case L6 based on the order of priority set forth in the QoS table 400. This is because in this case, the use of the case L6 will maximize the performance of the new flow, compared to the use of either case L1 or case L5. In step 718, a determination is made whether a suitable case has been identified.

If a suitable case is not identified, due to violation of wavelength grade requirements, execution proceeds to step 720, in which the identified case(s) are discarded and the OE/EO tables 300/350 are again referred to and the next best case(s) that minimize the total number of OE/EO interfaces added are identified. It will be recognized that this "minimum" will be equal to or greater than the minimum previously obtained. Execution then returns to step 706. This process is repeated until an acceptable case is identified. In this manner, an attempt is made to best minimize the total number of OE/EO interfaces added while also preserving the QoS of existing and new flows.

If it is determined in step 718 that an acceptable case has been identified, execution proceeds to step 722, in which a determination is made whether more than one acceptable case has been identified. If not (i.e., if only one acceptable case is identified), execution proceeds to step 724, in which the identified case is selected is designated as the optimal solution. If it is determined in step 716 that more than one acceptable case has been identified, execution proceeds to step 726, in which a single case is selected as the optimal solution using other criteria. For example, one way to pick from among the identified cases is in decreasing order of priority: First, "grooming only wavelengths, then "space-reusable only" wavelengths, then "unused" wavelengths. A different order of preference could be selected for implementation. Alternatively, a Monte Carlo process may be used to pick from one of the identified cases.

In step 728, a determination is made whether a case has been selected. If not, a default option is applied in step 730. This default option may be, for example, to exit the method. If in step 728 it is determined that a case has been selected, in step 732, an optimal wavelength from within the wavelengths to which the case maps is selected. If multiple wavelengths are available within a case, a Monte Carlo process can be applied to randomly select one of the available wavelengths.

Figure 8A:
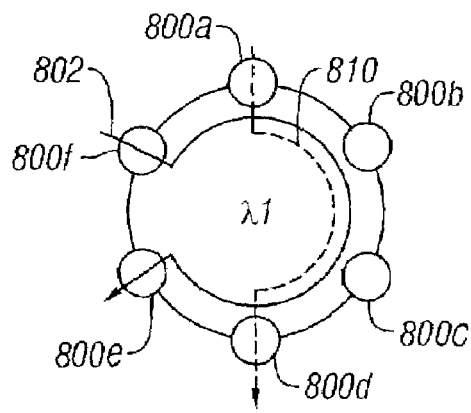
FIGS. 8A-8E are collectively used to illustrate an example of the embodiments shown in FIGS. 5 and 7.
Figure 8B:
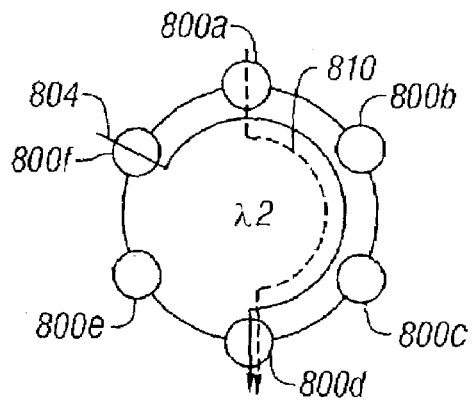
Figure 8C:
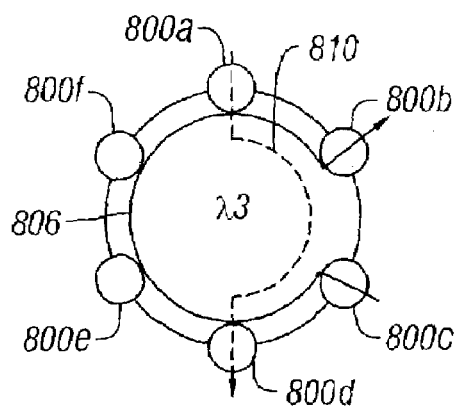
Figure 8D:
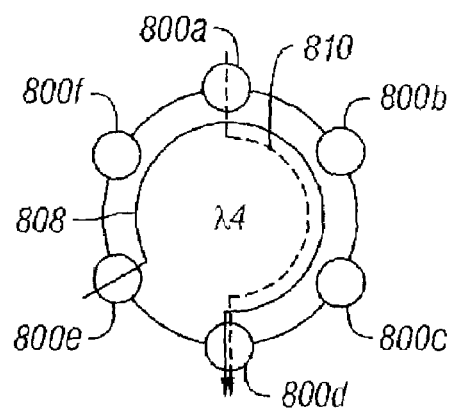
Figure 8E:
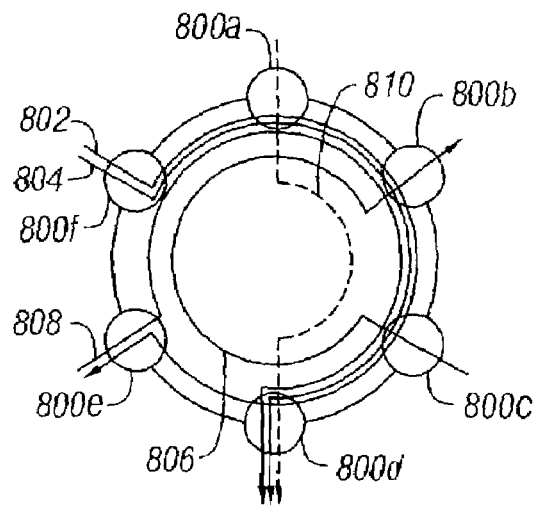

Examples of the embodiments illustrated in FIGS. 5 and 7 will now be provided with reference to FIGS. 8A-8E. Each of FIGS. 8A-8D illustrate a different existing traffic flow in exemplary WDM ring network comprising six nodes 800a-800f. In particular, FIG. 8A illustrates a flow 802 from node 800f to node 800e on a wavelength $\lambda 1$. FIG. 8B illustrates a flow 804 from node 800f to node 800d on a wavelength $\lambda 2$. FIG. 8C illustrates a flow 806 from node 800c to node 800b on a wavelength $\lambda 3$. FIG. 8D illustrates a flow 808 from node 800e to node 800 d on a wavelength $\lambda 4$. A new traffic flow 810 is also represented in each of FIGS. 8A-8D. FIG. 8E includes all of the existing flows 802-808, as well as the new flow 810.

Referring again to FIG. 5, as well as to FIGS. 8A-8E, in step 500, $\lambda 1$ is mapped to a first P, designated P1, $\lambda 2$ and $\lambda 4$ are mapped to a second P, designated P2, because they have the same spatial relationship (and in this example, QoS considerations are not take into account), and $\lambda 3$ is mapped to a third P, designated P3. In step 502, the relationship between the new flow 810 and Ps are mapped to the cases illustrated in FIG. 2. The results are L3, L8, and L4, for P1, P2, and P3, respectively.

In step 504, the OE/EO tables 300/350 are consulted and the minimum number of OE and EO interfaces added for each of the cases L3, L8, and L4 is determined to be 4, 2, and 6, respectively. Accordingly, L8, which maps to $\lambda 2$ and $\lambda 8$ and adds the lowest minimum number of OE/EO interfaces, is selected. In steps 506 and 510, because P2 has two wavelengths ($\lambda 2$ and $\lambda 4$), wavelength $\lambda 2$ is selected as an optimum wavelength by a process such as first-fit.

Turning now to the embodiment illustrated in FIG. 7, additional information must be provided or determined with reference to the flows illustrated in FIGS. 8A-8E. In particular, because the embodiment illustrated in FIG. 7 does take QoS considerations into account, QoS data must be accounted for. Accordingly, it will be assumed that flow 802 carries Gold traffic on $\lambda 1$, flow 804 carries Silver traffic on $\lambda 2$, flow 806 carries Best Effort traffic on $\lambda 3$, and flow 808 carries Gold traffic on $\lambda 4$. Additionally, the new flow 810 carries Gold traffic.

In step 700, $\lambda 1$ is mapped to a first P, designated P1. Unlike the preceding example, in this case, $\lambda 2$ and $\lambda 4$ cannot be mapped to the same P because, although they have the same spatial relationship, they do not carry the same class of service. Therefore, each of the remaining wavelengths $\lambda 2$, $\lambda 3$, and $\lambda 4$, must be mapped to its own P (i.e., P2, P3, and P4, respectively). In step 702, the relationship between the new flow 810 and Ps are mapped to the cases illustrated in FIG. 2. The results are L3, L8, L4, and L8 for P1, P2, P3, and P4, respectively.

In step 704, the OE/EO tables 300/350 are consulted and the minimum number of OE and EO interfaces added for each of the cases L3, L8, L4, and L8 is determined to be 4, 2, 6, and 2, respectively. Accordingly, L8, which maps to $\lambda 2$ and $\lambda 4$ and adds the lowest minimum number of OE/EO interfaces, is selected. In steps 706 and 716, the QoS table 400 is consulted and the order of priority indicates that a wavelength carrying Silver traffic has a higher priority than a wavelength carrying Gold traffic when a new flow carries Gold traffic. Accordingly wavelength $\lambda 2$, which carries Silver traffic, rather than wavelength $\lambda 4$, which carries Gold traffic, is assigned to the new flow 810 in step 724.

The embodiment described hereinabove for performing dynamic wavelength assignment (hereinafter referred to as the "WISE method" or the "original WISE method") does not consider, and therefore does not exploit, the availability of wavelength conversion at each of the nodes. On the contrary, the WISE method described hereinabove assumes that once lightpaths are set up for connection requests between node pairs, a lightpath must occupy the same wavelength on all of the fiber links through which it traverses. This is known as the "wavelength-continuity restraint". The development and availability of wavelength converters allows for the relaxing of this restraint so that traffic for a single flow may be carried on multiple wavelengths. Wavelength converters at intermediate nodes simply removes the data from one wavelength and send it to another wavelength. As will be seen below, it will be recognized that wavelength conversion reduces blocking.

Accordingly, an alternative embodiment to the above-described WISE method employs similar techniques, but takes advantage of the availability of wavelength converters for performing wavelength conversion for segments between nodes in a WDM ring network. The remainder of this disclosure will cover this alternative embodiment, referred to herein as the "WISE-2 method".

Figure 9:
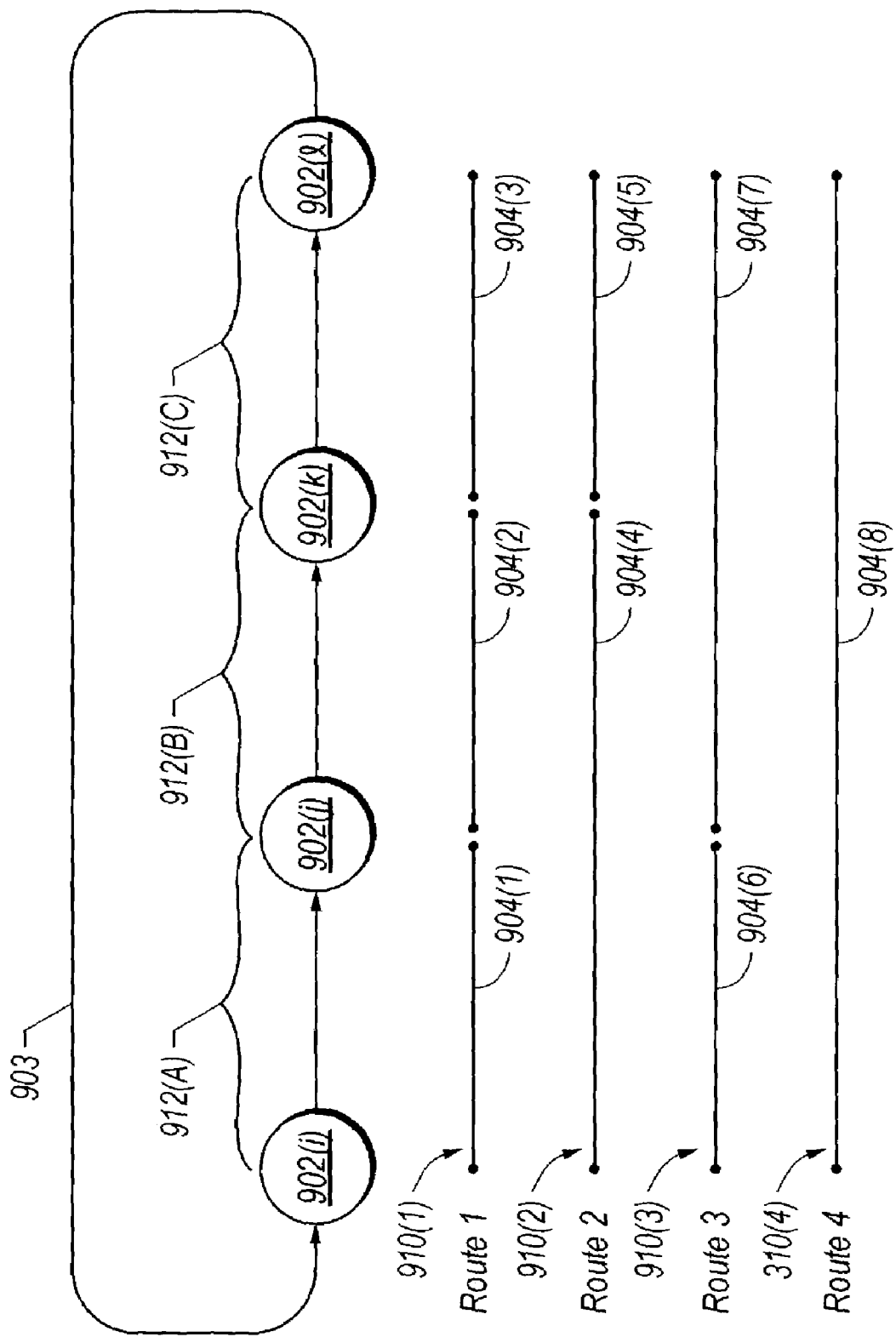
FIG. 9 illustrates a representation of a WDM network in which an alternative embodiment of the present invention in which wavelength conversion capabilities are considered is implemented.

FIG. 9 illustrates existing traffic flows between a source node 902($i$) to a destination node 902(1) via nodes 902($j$) and 902($k$) in a WDM ring network 903. Each of a plurality of sub-paths 904(1)-904(8) comprises a different wavelength. In all, there are four different routes 910(1)-910(4), each comprising a different combination of sub-paths 904(1)-904(8), from the source node 902($i$) to the destination node 902($l$)

Figure 10:
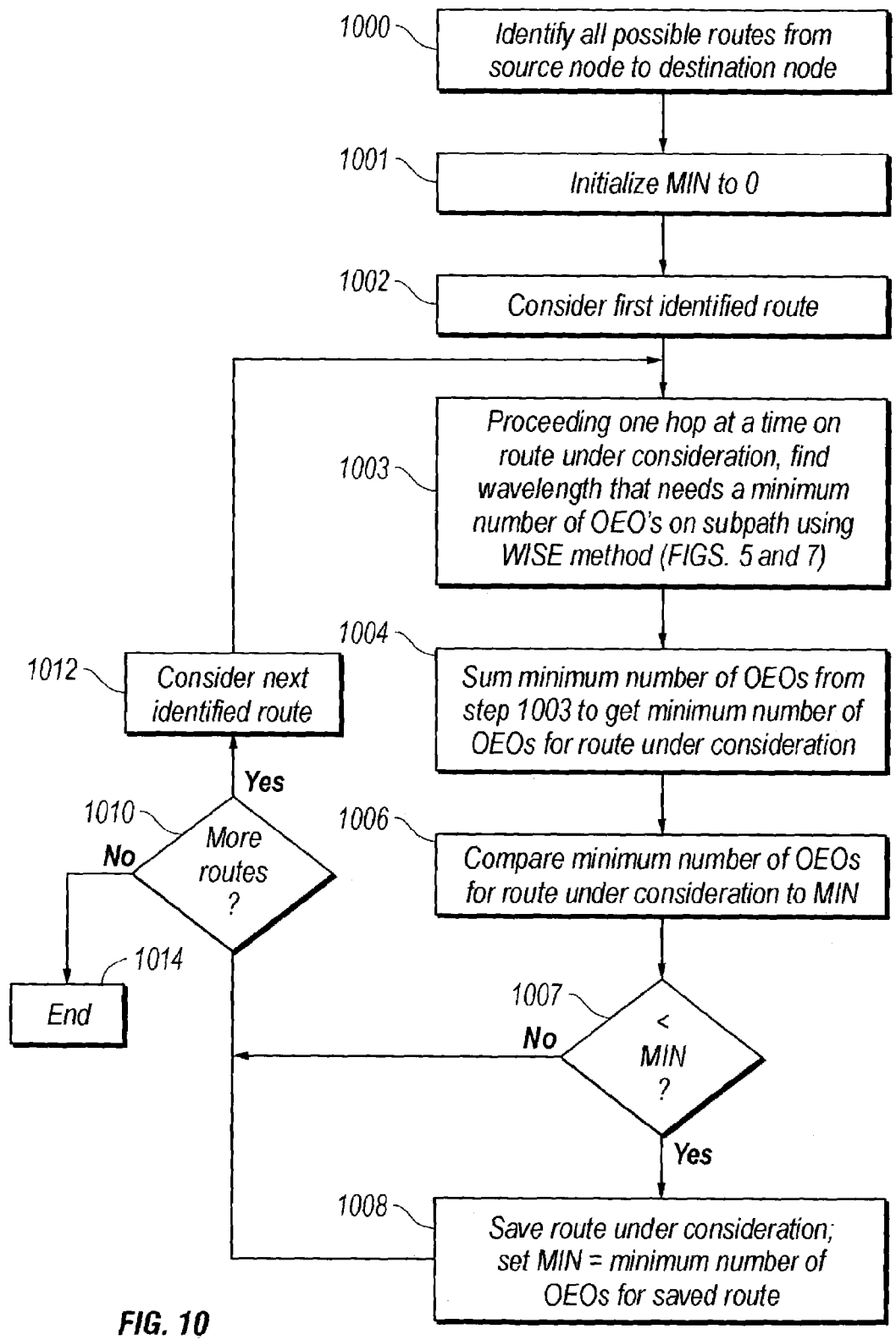
FIG. 10 is a flowchart of the operation of an alternative embodiment of the present invention in which wavelength conversion capabilities are considered.

FIG. 10 is a flowchart illustrating operation of the WISE-2 method. Referring to FIGS. 9 and 10, a specific example illustrating the operation of the WISE-2 method will now be described in detail.

In step 1000, all possible routes from the source node to the destination node are identified. It will be recognized that an N-hop path will provide $2^{N-1}$ routes. For example, referring to FIG. 9, there are three hops 912(A), 912(B), and 912($c$) (node 902($i$) to node 902($j$), node 902($j$) to node 902($k$), and node 902($k$) to node 902($l$), respectively); therefore, there are $2^{(3-1)} 2^2 = 4$ possible routes. As previously noted, each route is different from all of the others, as distinguished by the sub-paths that constitute the route. Each route may include up to a maximum of N sub-paths. In step 1001, a variable MIN is initialized to zero. In step 1002, the first of the routes identified in step 1000 is considered.

In step 1003, for the route under consideration, proceeding one hop at a time, the wavelength that needs the minimum number of OE/EOs on each sub-path of the route is determined using the original WISE method described above and illustrated in FIGS. 5 and 7. In this alternative embodiment, it will be assumed that wavelength conversion may be performed at each hop; thus, a different wavelength may be used for each hop. In step 1004, the minimum number of OE/EOs for each sub-path, as determined in step 1003, are added to get the total minimum number of OE/EOs for the route under consideration. In step 1006, the minimum number of OE/EOs for the route under consideration as determined in step 1004 is compared to the value of the variable MIN.

In step 1007, a determination is made whether the minimum number of OE/EOs for the route under consideration is less than MIN. If so, indicating that the route under consideration has the minimum number of OE/EOs thus far, execution proceeds to step 1008 in which the route under consideration is saved and the variable MIN is set to the minimum number of OE/EOs for the saved route. Execution then proceeds to step 1010, in which a determination is made whether there are more identified routes to be considered. If so, execution proceeds to step 1012, in which the next identified route is considered, and then returns to step 1003.

If in step 1007 it is determined that the route under consideration does not have the minimum number of OE/EOs thus far (i.e., if the minimum number of OE/EOs for the route currently under consideration is greater than the current value of the variable MIN), execution proceeds directly to step 1010, described above. Referring again to step 1010, if there are no more identified routes to be considered, execution terminates in step 1014.

Upon completion of the WISE-II method illustrated in FIG. 10, the variable MIN contains the minimum number of OE/EOs for the saved route. It will be assumed that each of the routes is considered using a "greedy search"; therefore, the total time required to select a route is longer than that required by the original WISE method. If two routes have the same minimum number of OE/EOs, the WISE-2 method selects the route that has the smaller number of wavelength conversions.

Figure 11:
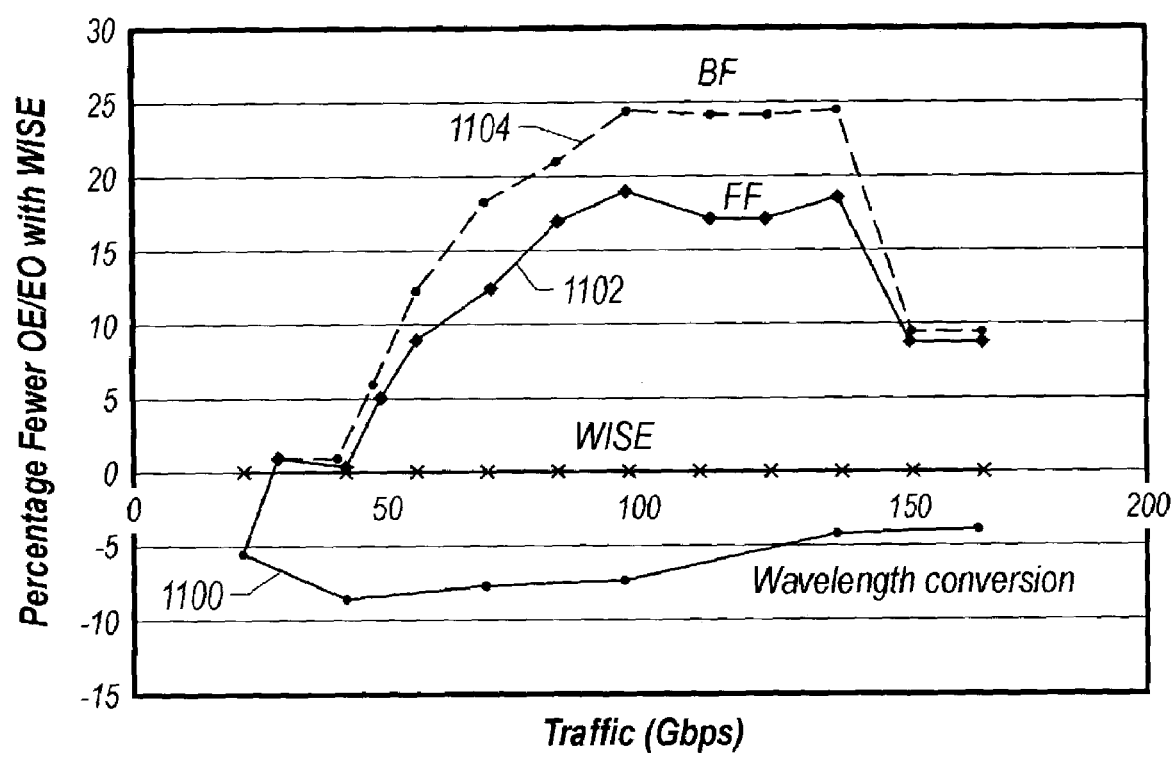
FIG. 11 is a graph illustrating performance improvements attained through implementation of the alternative embodiment.

The goal of the WISE-2 method is to provide a more optimal OE/EO solution. Simulations illustrate that this goal is accomplished. FIG. 11 is a graph illustrating the performance of various routing methods as indicated by the percentage fewer OE/EOs required by the original WISE method versus the method under consideration for the same traffic load (in Gigabits per second ("Gbps")). All links are assumed to be 10 Gbps. As illustrated in FIG. 11, the WISE-2 method, represented by a line 1100, results in a negative percentage fewer OE/EOs with the original WISE method for each traffic load level plotted. In other words, fewer OE/EOs are used using the WISE-2 method for each traffic load level considered. In contrast, each of the first-fit ("FF"), represented by a line 1102, and best-fit ("BF"), represented by a line 1104, algorithms results in a positive percentage fewer OE/EOs with the WISE algorithm for each traffic load level considered, meaning that both result in the use of a greater number of OE/EOs than the original WISE algorithm. Specifically, results show that the WISE-2 method requires between four and nine fewer OE/EOs versus the original WISE method for the same traffic load and results in an approximate 8% improvement over the original WISE method for the same traffic load.

Based upon the foregoing Detailed Description, it should be readily apparent that the present invention advantageously provides an innovative and efficient solution for dynamically assigning a wavelength to a new flow in a WDM ring.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of dynamic wavelength assignment for a requested new flow, from a source node to a destination node, in a Wavelength Division Multiplex ("WDM") ring network having traffic on existing wavelengths, comprising the steps of:

mapping a new flow and the existing wavelengths to one or more relevant cases, wherein each of the relevant cases is representative of a spatial relationship between a new flow and an existing wavelength, and the relevant cases are members of an identified set of cases defining all the possible spatial relationships for new flows and existing wavelengths;

associating with each member case of the set of cases the number of Optical/Electrical ("O/E") and Electrical/Optical ("E/O") interfaces which would be added at nodes if a new flow were sent on a wavelength corresponding to said each member case;

selecting one of the relevant cases to which the new flow and existing wavelengths have been mapped by referring to the associated numbers of O/E and E/O interfaces and identifying which of the relevant cases results in the fewest total number of optical-to-electrical ("OE") and electrical-to-optical ("EO") interfaces being added to the network; and selecting a wavelength corresponding to the selected one of the relevant cases, to be assigned to the new flow.

2. The method of claim 1, further including the step of grouping all existing wavelength that have a common spatial relationship to the new flow into one collection.

3. The method of claim 2 wherein the step of grouping existing wavelengths comprises the step of grouping all wavelengths having the same source and same destination into one collection.

4. The method of claim 2 wherein the step of grouping existing wavelengths comprises the step of grouping any existing wavelengths having different source nodes and different destination nodes into a same collection, if the existing wavelengths having different source nodes and different destination nodes have a same spatial relationship with respect to a new flow.

5. The method of claim 2, further including the steps of:
mapping a new flow and each collection of existing wavelengths to said relevant cases representative of a spatial relationship between a new flow and the existing wavelengths of said each collection; and
selecting one of the relevant cases to which the new flow and collections of existing wavelengths have been mapped by referring to the associated numbers of O/E and E/O interfaces and identifying which of the relevant cases results in the fewest total number of optical-to-electrical ("OE") and electrical-to-optical ("EO") interfaces being added to the network.

6. The method of claim 1 wherein the step of selecting one of the relevant cases further comprises the step of selecting one of the identified cases according to a predetermined order of priority with respect to wavelength that has common spatial relationships of the identified cases.

7. The method of claim 1 wherein the step of selecting one of the relevant cases further comprises the step of selecting one of the identified cases using a Monte Carlo process.

8. The method of claim 5, further including the step of selecting an existing wavelength from the collection of wavelengths corresponding to the selected one of the relevant cases, including using a Monte Carlo process.

9. The method of claim 1, further including the step of grouping existing wavelength in the network into collections of wavelengths, wherein said grouping comprises the steps of:
identifying existing wavelengths that have a common spatial relationship to a new flow and that carry an identical mix of traffic classes of service; and
grouping the identified wavelengths into one collection.

10. The method of claim 9, further including the steps of:
mapping a new flow and each collection of existing wavelengths to said relevant cases representative of a spatial relationship between a new flow and the existing wavelengths of said each collection;
selecting one of the relevant cases to which the new flow and collections of existing wavelengths have been mapped by referring to the associated numbers of O/E and E/O interfaces and identifying which of the relevant cases results in the fewest total number of optical-to-electrical ("OE") and electrical-to-optical ("EO") interfaces being added to the network; and
selecting one of the identified relevant cases that both maximizes performance of the new flow and minimally affects performance of existing network traffic.

11. The method of claim 10 wherein each relevant case is assigned a wavelength grade according to the mix of traffic classes carried by the existing wavelengths comprising the case and wherein step of the selecting one of the identified relevant cases comprises the steps of:
determining a class of traffic carried by the new flow; and
determining which of the identified relevant cases has a wavelength grade that would best maximize the performance of the class of traffic carried by the new flow.

12. A method of dynamic wavelength assignment for a requested new flow, from a source node to a destination node, in a Wavelength Division Multiplex ("WDM") ring network having traffic on existing wavelengths, comprising steps of:
mapping a new flow and the existing wavelengths to one or more relevant cases, wherein each of the relevant cases is representative of a spatial relationship between a new flow and an existing wavelength, and the relevant cases are members of an identified set of cases defining all the possible spatial relationship for new flows and existing wavelengths, said spatial relationships including the location of the source and destination nodes of the new flow in relation to the location of the source and destination nodes of the existing wavelength, including whether the existing wavelength and new flow have a common source node, including whether the existing wavelength and new flow have a common destination node, and including overlap between paths of the existing wavelength and the new flow;
associating with each member case of the set of cases the number of Optical/Electrical ("O/E") and Electrical/Optical ("E/O") interfaces which would be added at nodes if a new flow were sent on a wavelength corresponding to said each member case;
selecting one of the relevant cases to which the new flow and existing wavelengths have been mapped by referring to the associated numbers of O/E and E/O interfaces and identifying which of the relevant cases results in the fewest total number of optical-to-electrical ("OE") and electrical-to-optical ("EO") interfaces being added to the network; and
selecting a wavelength corresponding to the selected one of the relevant cases to be assigned to the new flow.

13. A method for performing dynamic wavelength assignment on a ring in a Wavelength Division Multiplex ("WDM") network having traffic on existing wavelengths, comprising the following steps for each new requested traffic flow from a source node to a destination node on the ring:
identifying all possible routes from the source node to the destination node;
for each of the identified routes, proceeding one hop at a time, determining a wavelength that requires a minimum number of optical-to-electrical and electrical-to-optical ("OEO") interfaces on each sub-path comprising the route, comprising
classifying the new requested traffic flow into one of a set of spatial relationships for each existing wavelength for each hop on the route, said set of spatial relationships defining all the possible spatial relationships for new flows and existing wavelengths on said each hop, associating with each member of the set of spatial relationship types the member of Optical/Electrical ("O/E") and Electrical/Optical ("E/O") interfaces which would be added at nodes if a new flow were sent on an existing wavelength corresponding to said each set member, and determining, by referring to the associated numbers of O/E and E/O interfaces, an existing wavelength in said each hop that requires the minimum number of optical-to-electrical and electrical-to-optical ("OEO") interfaces needed for each spatial relationship selected for each hop;

for each of the identified routes, adding the minimum number of OEO interfaces determined for all of the sub-paths of the route to calculate a total minimum number of OEO interfaces for the route; and selecting the route having the smallest total minimum number of OEO interfaces.

14. The method of claim 13 further comprising providing wavelength conversion capabilities at least one intermediate node in the path from the source node to the destination node.

15. The method of claim 14 wherein, if two routes have the same smallest total minimum number of OEO interfaces, selecting the one of the two routes that employs the smallest number of wavelength conversions.

16. The method of claim 13 wherein one of the sub-paths comprises at least one hop.

17. The method of claim 13 further comprising providing wavelength conversion capabilities at least one intermediate node in the path from the source node to the destination node.

18. A system for performing dynamic wavelength assignment on a ring in a Wavelength Division Multiplex ("WDM") network having traffic on existing wavelengths comprising, for each new requested traffic flow from a source node to a destination node on the ring:

means for classifying the new requested traffic flow into one of a set of spatial relationships for each existing wavelength for each segment on a path around the ring between the source and destination nodes, said set of spatial relationships defining all the possible spatial relationships for new flows and existing wavelengths on said each segment;

means for associating with each member of the set of spatial relationships the number of Optical/Electrical ("O/E") and Electrical/Optical ("O/E") interfaces which would be added at nodes if a new flow were sent on a wavelength corresponding to said each set member;

means for determining, by referring to the associated members of O/E and E/O interfaces, an existing wavelength in said each segment that requires the minimum number of optical-to-electrical and electrical-to-optical ("OEO") interfaces needed for each spatial relationship selected for each segment;

means for determining the total number of OEO interfaces needed for the entire path between the source and destination nodes along the ring; and means for selecting the existing wavelengths that minimize the OEO interfaces.

19. The system of claim 18 wherein the means for determining the total number of OEO interfaces needed for the entire path between the source and destination nodes along the ring comprises means for summing the corresponding number of OEO interfaces determined for all of the segments in the path.

20. The system of claim 18 further comprising means for defining a plurality of routes corresponding to the path, wherein the means for classifying comprises, for each of the routes, for each segment of the route, means for classifying the new requested traffic flow into one of a set of spatial relationships for each existing wavelength.

21. The system of claim 20 wherein the means for determining a corresponding number of OEO interfaces needed further comprises, for each route, means for determining a corresponding number of optical-to-electrical and electrical-to-optical ("OEO") interfaces needed for each spatial relationship type selected for each segment of the route.

22. The system of claim 21 wherein the means for determining the total number of OEO interfaces needed for the entire path comprises, for each route, means for summing the corresponding number of OEO interfaces determined for all of the segments in the route.

23. The system of claim 22 further comprising means for selecting the one of the routes that has the minimum total number of OEO interfaces.

24. The system of claim 18 wherein one of the segments comprises at least one hop.

25. The system of claim 18 further comprising wavelength conversion capabilities at least one intermediate node in the path from the source node to the destination node.

* * * * *